Dec. 19, 1967   B. O. KRAUSE   3,359,055
MICROSCOPE SLIDE PLATFORM USING REFERENCE
WEDGE FOR AUTOMATIC REFOCUSING
Filed Dec. 16, 1963
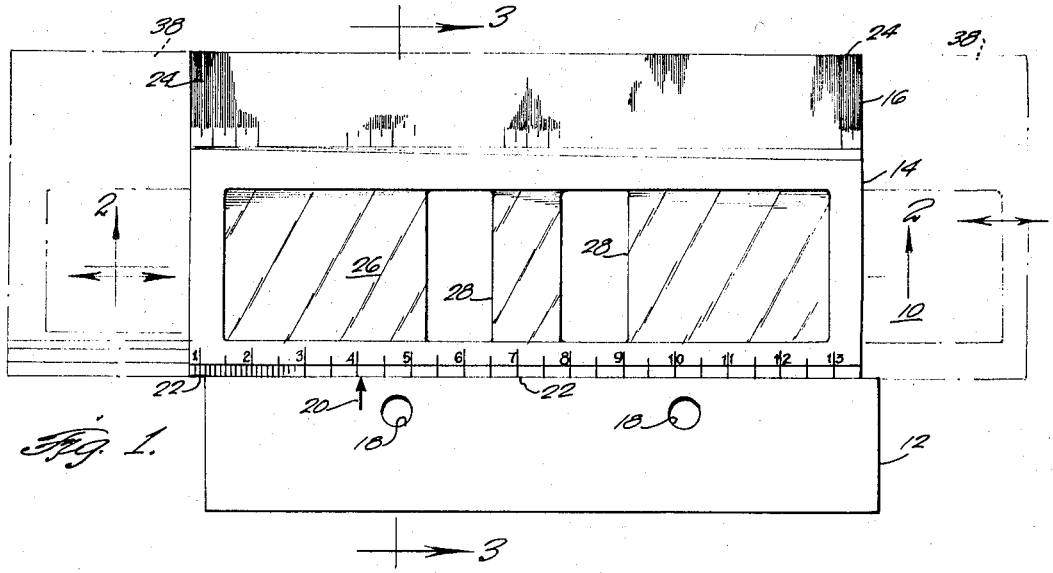
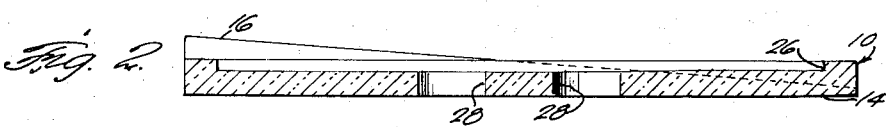
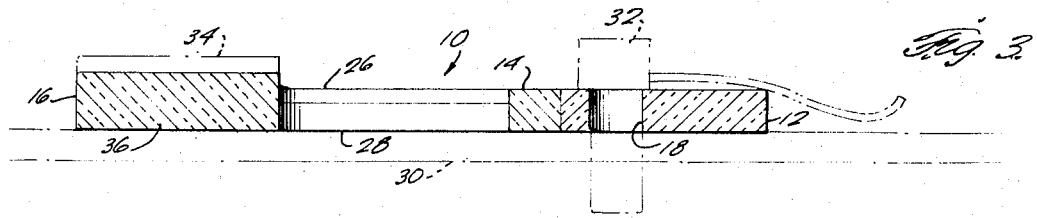
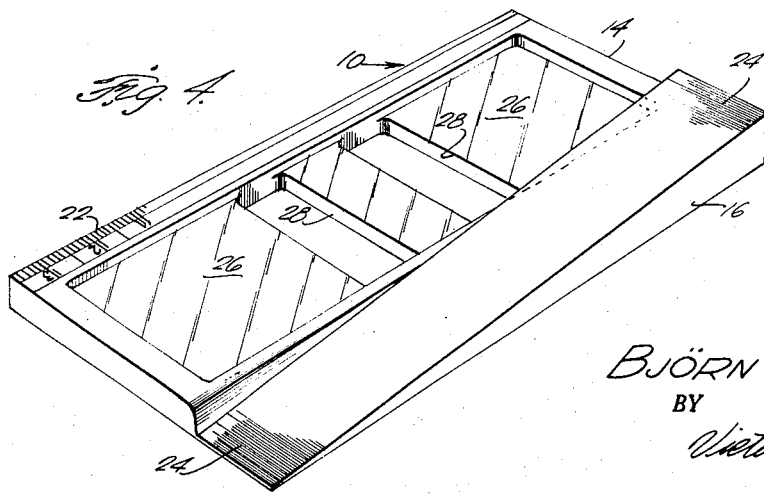
INVENTOR.
BJÖRN O. KRAUSE
BY
Victor J. Evans Co.
Attorneys

United States Patent Office 3,359,055
Patented Dec. 19, 1967

3,359,055
MICROSCOPE SLIDE PLATFORM USING REFERENCE WEDGE FOR AUTOMATIC REFOCUSING
Bjorn O. Krause, 227 Indian Road, Wayne, N.J. 07470
Filed Dec. 16, 1963, Ser. No. 336,093
4 Claims. (Cl. 350—92)

ABSTRACT OF THE DISCLOSURE

A microscope high power auto-focus in which there is an automatic focusing device for use with a microscope having a setting plate, an indicator on the setting plate, a slide platform including a graduated scale adapted for movement with respect to the indicator, and a focusing wedge secured on the platform and including a plurality of division indicia marks thereon.

---

This invention relates generally to a reference determining device for focusing of a microscope and more particularly to an automatic focusing device for providing a reference indication for focusing of particular slides employed with high power microscopes.

Heretofore, the focusing of a microscope and adjustment of a slide in relationship thereto has been accomplished by trial and error method. In previous microscope examinations of a specimen on a slide, the slide is placed on the stage of the microscope and positioned in a line therewith for viewing. The microscope is then focused on the specimen, however, such focusing is not easily accomplished if the specimen is not placed directly in the viewing line. Such accurate placement of a slide is, of course, difficult to attain upon the first insertion of the slide on the stage. Therefore, it is necessary that the slide be moved about on the stage as the focusing operation is being made. Such trial and error atempts require constant handling of the slide during the focusing operation. Breakage and spoilage of this slide and specimen are a few hazards which may result from such constant handling. These difficulties are, of course, more apparent and intensified when high power microscopes are employed. Furthermore, individuals not accustomed to the proper use of a microscope have even more difficulty in aligning a slide and focusing thereon. Students in particular have great difficulty in achieving the proper alignment of a specimen and focusing of a microscope.

In a particular class room situation the instructor may have a collection of slides to be viewed by the students. Without some means for assisting in the focusing of a microscope the students may waste a considerable amount of time by the trial and error method formerly required. In many instances, particular students may not be able to accomplish this goal and the instructor must then sacrifice his time to assist in the focusing and aligning operation. Since differences in vision between individuals is not uncommon, the focusing setting which the instructor will require will in few instances be the same setting which the student will require. Therefore, some means is required which will provide the exact setting for the student's vision in the focusing operation.

It is, therefore, a primary object of this invention to provide an automatic focusing device for use with a microscope which will eliminate the trial and error method of focusing a microscope and aligning a slide thereon.

It is another object of this invention to provide an automatic focusing device for use with a microscope, particularly in the high power range, which will provide immediate reference to the focusing setting of a particular slide.

Another object of the present invention is to provide an automatic focusing device for use with a microscope which does not require any compensation for differences in vision which occurs between individuals.

These and other objects will be more fully realized from the structure of the present invention which includes broadly a setting plate adapted for being clamped to the stage of a microscope, a slide platform having graduations on one side thereof, and a wedge attached to the platform and having marks thereon. The platform and wedge are free to move on the stage from a slide viewing position to a position of having the marks in line with the microscope and the graduation in reference indicating relationship to an indcator on the setting plate. With this structure, a person may adjust a microscope to the proper focus on a particular slide, move the platform and wedge to a position of having the marks on the wedge in exact focus, and then record the position the indicator may have in relation to the graduations. With this record, the slide may be viewed at another time by placing it on the platform which in turn is positioned on the stage of the microscope with the marks of the wedge in line therewith and the indicator at the proper reading on the graduations. The microscope is then adjusted to bring the marks in exact focus and the platform is moved to a position of having the slide in line with the microscope. This later positioning is easily found, since the specimen will appear immediately when it crosses the line of the microscope.

The structure of the present invention, however, will be more fully realized and understood from the following detailed description when taken in conjunction with the accompanying drawings wherein:

FIGURE 1 is a top view of the invention showing the relative arrangement of the elements thereof in reference determining position;

FIGURE 2 is a sectional view taken along lines 2—2 of FIGURE 1 and illustrating the relative position of some elements and the angular displacement therebetween;

FIGURE 3 is a sectional view taken along lines 3—3 of FIGURE 1 illustrating one preferred mode of attaching and placing the elements on the stage of the microscope; and FIGURE 4 is a perspective view of the slide platform and wedge portion of the invention illustrating more clearly the association of the various elements.

It is to be understood that like reference numerals throughout the various views of the drawing designate the same or similar structures.

With reference to FIGURE 1, there is shown therein the novel structure of this invention, the automatic focusing device designated with the reference numeral 10. The automatic focusing device includes a setting plate 12, a slide platform 14 and a wedge portion 16. Setting plate 12 includes a pair of holes 18 from providing clamping to the stage of a microscope and an indicator arrow 20 on one side thereof. Platform 14 and wedge 16 are secured together in a single piece construction preferably and are free to move in relationship to setting plate 12 on the stage of the microscope. Platform 14 includes along its one side adjacent plate 12 a graduated scale 22 preferably numbered. Also, wedge 16 includes a plurality of marks 24 disposed along an upper surface thereof and preferably equally spaced from one another. The graduations on scale 22 and marks 24 may be more or less numerous than those shown on the particular exemplification of the drawing as desired. It may be preferable, however, to provide a sufficient number of graduations on scale 22 and marks 24 on wedge 16 to provide the highest attainable accuracy for not only recording but for positioning the elements from a known record.

A recess 26 and a pair of windows 28 are provided in the upper surface of platform 14. Recess 26 extends substantially the length of platform 14 so that a slide may be moved therein and also for providing easy removal of a slide therefrom with the assistance of windows 28. Furthermore, windows 28, passing entirely through the platform allow unobstructed viewing of a specimen. Although the elements of the invention are preferably transparent with the exception of the indicator, the scale, and the marks, there may exist some slight aberration or interference to the passage of light therethrough. Since this may impair the viewing of the specimen in some case, windows 28 are provided for overcoming these interferences when they exist.

FIGURE 2 shows more clearly the relationship between platform 14 and wedge portion 16. The upper surface of platform 14 including the recess and windows therein is parallel to the base portion or lower surface of the device. The upper surface of wedge portion 16, is angularly displaced with respect to the upper surface of the platform and the base or lower surface of the device. This angular displacement provides the means for making an accurate focus setting after scale 22 is properly positioned with respect to indicator 20.

FIGURE 3 illustrates the preferred clamping arrangement between stage 30 (shown in phantom lines) and plate 12. A pair of clips 32 (also shown in phantom) are inserted through respective holes 18 and corresponding holes provided in stage 30. These clips may include means for holding plate 12 securely to the stage and to prevent any vertical as well as horizontal movement therebetween. The differential between respective ends of the wedge portion is clearly shown and better visualized by comparison of the distance between phantom line 34 designating the highest point thereof and dotted line 36 as the lowest point.

FIGURE 4 illustrates more clearly the relationship between platform 14 and wedge portion 16. A better visualization of the windows, recess, and scale is presented by the perspective showing of the invention in FIGURE 4.

In practice, the device is employed as follows to facilitate easy and quick focusing of a microscope on a specimen. A slide is inserted in recess 26, the setting plate is clamped on the microscope stage, and the platform is placed thereon. While the initial focusing operation takes place, the platform is in spaced relationship to the setting plate and the slide and recess are in line with the microscope. The specimen on the slide is then brought into focus. When the focusing is accomplished, the microscope needs no further adjustment for recording the reference to be applied to that particular slide. With the focus set, platform 14 and wedge portion 16 are moved to an adjacent position with respect to plate 12 as shown in FIGURE 1. When scale 22 is adjacent the edge of the setting plate, marks 24 are in line with the microscope and disposed for viewing therethrough. Platform 14 is then moved from end to end as shown by phantom lines 38 in FIGURE 1 until one of the marks comes into focus. All of marks 24 will, of course, not be in focus due to the differential in height from one end of the wedge portion to the other end thereof. When a mark is in focus and centered in the eyepiece of the microscope, the operator has only to refer to the graduation on scale 22 which is in line with indicator 20 and make a reference of it.

This reference will then always apply to the proper focus to be employed with that particular slide. This record of the reference is used in the following manner to find the right focus necessary for proper viewing of that slide. The operator places the particular slide on the platform and in turn, the platform on the stage in adjacent relationship to setting plate 12. Scale 22 is adjusted with respect to indicator arrow 20 so that the reference is in line therewith. At this position marks 24 are in line with the microscope and available for viewing. The focus of the microscope is then adjusted until those marks in line therewith come into proper view and focus. At the accomplishment of this focusing operation, the specimen and slide will be in exact focus. This focus setting on the microscope for one person will not necessarily be the setting for another person. Since, however, the same person makes the setting while the marks are in line with the microscope, that same setting will apply to the specimen as well. Therefore, a difference in vision between the person making the reference record and the person employing that record at a later time, will not affect the focusing operation for the latter person. Regardless of the differences in vision, the person employing the record for finding the correct focus will find that a proper focus on the marks will be the proper focus on the slide as well.

After this correct focus setting has been found with respect to marks 24 the platform may be positioned with the slide in line with the microscope and the specimen will then be in correct focus.

In a classroom situation in which the device may be employed, this novel invention enables an instructor to assign a permanent setting number or reference record to all of the microscope slides in his collection. Future use of these slides by students will then make it possible for them to rapidly set the exact focus for a particular slide without handling the slide during the focusing operation. This will in effect eliminate any possibility of slide breakage as a result of the usual high power microscope technique.

The entire mechanism has no moving parts and may be constructed of clear plastic, since this will enable all such units, within fine tolerances, to be made alike.

It is to be understood that the slide need not remain in the recess of the platform during the focusing operation except when the specimen is to be viewed. That is, the slide may be removed while the marks are being brought into focus and while scale 22 is being positioned with respect to indicator 20. Furthermore, the device may be constructed without the recess or support for the slide. Since a setting of the focus can be obtained on the slide by itself, it may then be removed and the setting number found by placing the wedge and platform on the microscope and following the above operation.

The principles of the invention explained in connection with the specific exemplification thereon will suggest many other applications and modifications of the same. It is accordingly desired that, in construing the breadth of the appended claims they shall not be limited to the specific details shown and described in connection with the exemplification thereof.

What is claimed is:

1. An automatic focusing device for use with a microscope having a stage thereon for receiving a slide comprising a setting plate adapted for being clamped to the stage of the microscope, a generally rectangular slide platform with an upper surface and having a plurality of graduations along one edge thereof, and a focusing wedge including a plurality of marks on an upper surface thereof secured at the opposite edge from said one edge of said platform, said setting plate including an indicator at an edge of said setting plate for providing a reference with respect to the graduations along the edge of said slide platform, said platform disposed for receiving a slide, said platform and wedge being free to move on the stage relative to said setting plate from a position of having the slide disposed in a line with the microscope to a position of having the wedge disposed in a line with the microscope wherein the graduations are in reference indicating position with respect to the indicator.

2. The device of claim 1 wherein the upper surface of said wedge is angularly disposed with respect to said upper surface of said platform, said platform including a recess for receiving and supporting a slide.

3. The device of claim 2 wherein said platform includes means for facilitating removal of a slide from the recess.

4. The device of claim 2 wherein said recess has a larger surface area than the surface area of a slide.

References Cited

UNITED STATES PATENTS 2,781,692  2/1957  Krause _____ 350—92

DAVID H. RUBIN, *Primary Examiner.*

PAUL R. MILLER, *Assistant Examiner.*